United States Patent [19]

Brangers et al.

[11] Patent Number: 5,227,111
[45] Date of Patent: Jul. 13, 1993

[54] MANUFACTURE OF MOISTURE CURABLE ORGANOSILOXANE COMPOSITIONS

[75] Inventors: George D. Brangers, Elizabethtown, Ky.; Carlos Mesa-Forero, Brussels, Belgium; Rudi Ulzheimer, Idstein-Eschenhahn, Fed. Rep. of Germany; Charles B. Winter, Midland, Mich.

[73] Assignee: Dow Corning, S.A., Seneffe, Belgium

[21] Appl. No.: 823,394

[22] Filed: Jan. 21, 1992

Related U.S. Application Data

[63] Continuation-in-part of Ser. No. 695,882, May 6, 1991, abandoned.

[51] Int. Cl.⁵ .............................................. B29C 47/74
[52] U.S. Cl. .................................. 264/211.23; 264/101; 264/211.24; 264/331.11; 264/347; 366/75; 425/203; 425/204; 425/205; 425/208; 524/860
[58] Field of Search ..................... 264/211.23, 211.24, 264/349, 347, 236, 101, 331.11, 102; 425/203, 204, 205, 208; 366/75, 85, 86, 91, 79; 524/860

[56] References Cited

U.S. PATENT DOCUMENTS

| | | | |
|---|---|---|---|
| 3,960,802 | 6/1976 | Beers et al. | 264/349 |
| 4,371,682 | 2/1983 | Hashimoto | 264/331.11 |
| 4,431,311 | 2/1984 | Kolossow | 264/45.9 |
| 4,528,156 | 7/1985 | Fukuda et al. | 264/331.11 |
| 4,528,324 | 7/1985 | Chung et al. | 264/102 |
| 4,649,005 | 3/1987 | Kobayashi et al. | 264/176.1 |
| 4,696,970 | 9/1987 | Sumimura et al. | 264/211.23 |
| 4,730,935 | 3/1988 | Kolossow | 425/207 |
| 4,897,236 | 1/1990 | Rabiger et al. | 264/349 |

FOREIGN PATENT DOCUMENTS

| | | | |
|---|---|---|---|
| 2357945 | 5/1975 | Fed. Rep. of Germany | 425/208 |
| 2657432 | 6/1977 | Fed. Rep. of Germany | 425/208 |
| 3407789 | 10/1984 | Fed. Rep. of Germany | 366/79 |
| 57-41932 | 3/1982 | Japan | 264/349 |

Primary Examiner—Jeffery Thurlow
Attorney, Agent, or Firm—Robert Spector

[57] ABSTRACT

The specification is concerned with a process and apparatus for continuous manufacture of moisture curable silicone compositions. The procedure involves continuously introducing to the first mixing zone of a screw-extruder device the ingredients of a moisture curable organosiloxane composition containing a silanol-terminated polyorganosiloxane containing an least two silanol groups per molecule, a curing agent consisting of at least one silane containing at least 3 alkoxy groups per molecule, and a catalyst for the curing reaction which takes place in presence of moisture, subjecting the ingredients to the mixing and transporting action of the screw of the screw-extruder device for a period of time to effect mixing to homogeneity of the ingredients in the mixture, passing the mixture through a residence zone in which the mixture is not subjected to the mixing action of the screw of the screw-extruder device and in which residence zone the mixture is permitted to react for a period of time and transporting the composition through a second mixing zone from which volatile materials are exhausted from the mixture and extruding the mixture into storage containers.

12 Claims, 2 Drawing Sheets

MANUFACTURE OF MOISTURE CURABLE ORGANOSILOXANE COMPOSITIONS

STATUS OF COPENDING APPLICATIONS

This application is a continuation-in-part of copending application Ser. No. 07/695,882 filed on May 6, 1991 and now abandoned.

BACKGROUND OF THE INVENTION

1. Field of the Invention

This invention is concerned with improvements in or relating to the manufacture of moisture curable organosiloxane compositions.

2. Background Information

Moisture curable organosiloxane compositions are known. These compositions find use in various applications, for example as sealant compositions which can be applied to a joint between elements and cured to provide an elastomeric seal between them. These compositions cure at room temperature and are particularly attractive for use as sealant compositions for sealing, for example highway joints, joints in articles for example vehicle headlights and joints in buildings and in glazing applications, in view of the fact that no special heating or other cure conditions are generally required to produce a seal of desired quality.

Many moisture curable organosiloxane compositions have been proposed and are generally formed from an at least one substantially linear polyorganosiloxane containing at least two silanol groups, a crosslinker capable of reaction with the polyorganosiloxane to yield a crosslinked network, and catalyst materials. These compositions cure by a condensation reaction promoted by moisture.

The crosslinker in moisture curable organosiloxane compositions is generally selected from polyfunctional silanes which readily hydrolyze, those commonly employed being triacetoxy silanes, trialkoxy silanes, triamino silanes and trioximo silanes. It is believed that the condensation reaction proceeds via a capping of the polyorganosiloxane with, for example, dialkoxyalkylsilyl groups followed by interaction of the alkoxy groups of the end caps and or silanol groups to yield a crosslinked structure.

While some curing of the composition during manufacture and storage is acceptable, it is important that this curing does not proceed too far prior to application at its intended work site at which it is intended to cure under influence of atmospheric moisture. Thus it is important that exposure of the composition to moisture is kept to a uniform, acceptably low extent from batch to batch during manufacture and storage, otherwise the composition cures to an extent which renders it impractical for its intended purpose.

Moisture curable compositions based on organosilicon compounds generally contain finely divided fillers. The fillers generally used are those which strengthen the cured material, reduce the cost of the product or otherwise confer a desired combination of properties. Typical fillers include but are not limited to high surface area silicas, ground quartz, iron oxide, zinc oxide, carbon black, calcium carbonate and diatomaceous earth.

Moisture curable organosiloxane compositions can be manufactured using a batch process during which the filler and polyorganosiloxane are mixed together, the crosslinker and catalyst are added to the mixture and the resultant composition is than packaged in containers such as cartridges, which are then sealed in an airtight manner to prevent ingress of moisture.

A continuous process for preparing moisture curable organosiloxane compositions using a devolatilizing extruder is described in U.S. Pat. No. 3,960,802, which issued to Beers et al. on Jul. 9, 1985. The ingredients of the composition comprise a silanol terminated polydiorganosiloxane, a crosslinking silane and a silanol-reactive organometallic ester compound of a metal, and an optional filler. This patent mentions a twin screw Werner-Pflieferer mixer Model 2SK as a preferred devolatilizing extruder.

U.S. Pat. No. 4,528,324, which issued to Chung et al. on Jul. 9, 1985 describes further developments in a continuous process for preparing moisture curable organosiloxane compositions using a devolatilizing extruder. Chung et al. teach using a catalyst for the end-capping reaction of the polydiorganosiloxane together with an optional scavenger to react with free silanol groups.

Recycling a major portion of a rubber composition from one section of an extruder through an annular chamber back to a previous section of the extruder to increase the time during which the composition is exposed to the masticating action of the of the screws in the extruder is taught in U.S. Pat. No. 4,897,236, which issued to Rabiger et al. on Jan. 30, 1990.

Among the various crosslinkers which have been proposed for moisture curable organosiloxane compositions the alkoxysilanes are particularly attractive because by-products of the condensation are neither acidic nor alkaline, so that generally they do not cause corrosion of substrates with which the curing material comes in contact. However, the alkoxysilanes yield alcohol as a by-product of the condensation reaction and while this is generally acceptable when the composition is used under well vented conditions, escape of the alcohol during manufacture of the composition is regarded as undesirable.

Attempts to prepare moisture curable organosiloxane using trialkoxysilanes as the crosslinker by mixing the ingredients in a twin screw extruder have revealed difficulties due to the need for the composition to remain resident in the extruder for sufficient time to permit that part of the cure in which end-capping of the polymer occurs to proceed to a desired extent and adequate venting of water and by-product from the composition prior to exit of the composition from the extruder. While these requirements may be met by use of an extruder of sufficient length or by linking two or more extruders in series, this is undesirable on a cost basis.

SUMMARY OF THE INVENTION

The present inventors have discovered that moisture curable compositions can be prepared on a commercial scale and in a continuous fashion using a devolatilizing extruder of the twin screw type of comparatively short length if the composition is fed through a residence zone prior to final processing. In contrast to the recycling chamber used in prior art extruders, such as the one described in the aforementioned patent to Rabiger et al., where the objective is recycling of a major portion of the material being processed, the overall direction of material flow in the residence zone of the present invention is the same as the flow of material in the barrel of the extruder, with the result that the material in the residence zone reenters the barrel of the extruder downstream relative to the location from which it entered the residence zone.

DETAILED DESCRIPTION OF THE INVENTION

Figure 1:
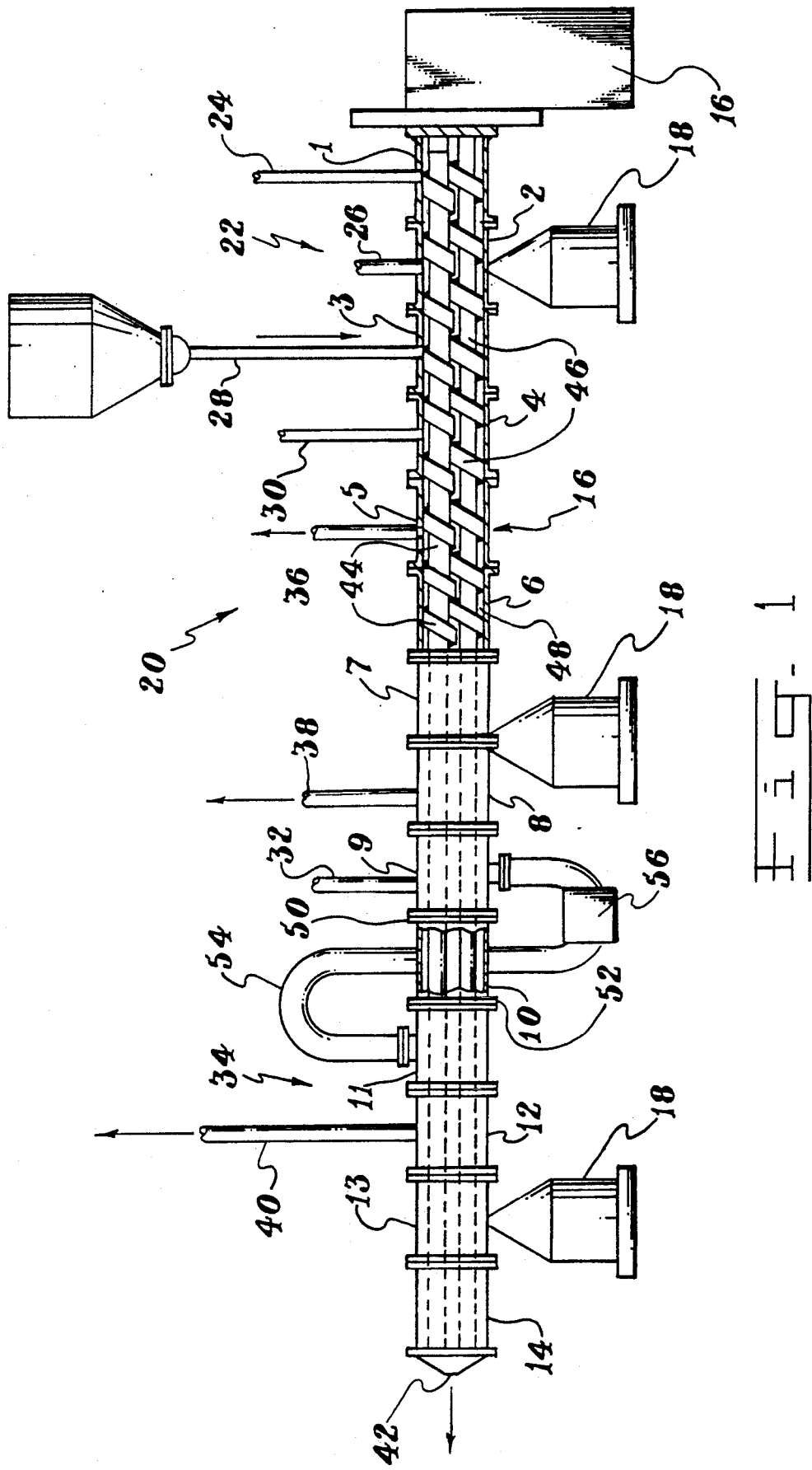
FIG. 1 is a diagrammatic side elevation, partly in cross section, of a screw extruder device of the present invention

The invention provides in one of its aspects a process for the continuous preparation of a moisture curable organosiloxane composition comprising the steps of
1) continuously introducing into a first mixing zone of a screw-extruder the ingredients of said composition to form a mixture comprising at least one silanol-terminated polyorganosiloxane containing at least two silanol groups per molecule, one or more polyalkoxy silanes and a catalyst for the curing reaction,
2) subjecting the mixture to the mixing and transporting action of the screw of the screw-extruder in said first mixing zone for a period of time to effect blending the ingredients of said mixture to homogeneity,
3) transporting said mixture from said first mixing zone through a residence zone in which the mixture is not subjected to the mixing action of said screw, in which residence zone said mixture is permitted to react for a period of time, and
4) transporting said mixture from said residence zone through a second mixing zone of said extruder located downstream relative to said first mixing zone, wherein volatile materials are removed from the mixture to form said composition, and,
5) extruding the composition into storage containers.

DESCRIPTION OF THE PRESENT EXTRUDER

The screw-extruder device used in a process according to the invention is an essentially closed apparatus and is preferably of the continuous kneader mixer type which has a barrel comprising a first mixing zone containing one or more entry ports through which ingredients of the moisture curable organosiloxane composition can be supplied into the barrel and a second mixing zone containing vent means through which volatile components can leave the barrel. The barrel houses a screw device which is rotatable in the barrel and has screw flights arranged to mix ingredients supplied to the barrel and to transport the mixture through the barrel.

The screw device may comprise a single screw or a multiple screw and may be reciprocable or not in the barrel. Multiple screw-extruders are preferred. Most preferred are twin screw-extruders having two, fully intermeshing, co-rotating screws installed parallel to each other in the barrel, entry ports for feed streams and vents provided towards the exit end of the device. The screws may be single flight or double flight. If desired two or more screw-extruder devices of the same or different types may be connected together, for example in-line. If desired, selected sections of the screw-extruder device may be heated or cooled.

For a given screw configuration the rate of screw rotation determines the degree of mastication of the mixture and the rate at which the mixture of ingredients travels through the extruder, and is chosen so that mixing to homogeneity is achieved in the shortest possible time.

Passage of the mixture of ingredients from the first mixing zone of the extruder through the essentially closed residence zone permits a certain maturing of the ingredients to form a moisture curable organosiloxane composition, accompanied by generation of by-products which pass with the mixture through the residence zone.

After passing through the residence zone the mixture of ingredients renters the extruder in a second mixing zone located downstream with respect to the first mixing zone. While in the second mixing zone the mixture is subjected to final processing for extraction of volatile materials to form a moisture curable organosiloxane composition that is dispensed into storage containers, for example cartridges or drums.

The residence zone of the present extruder is preferably in the form of a tubular chamber located outside of the barrel. The tube connects the first mixing zone of the barrel with a second mixing zone located "downstream" relative to first mixing zone of the extruder that contains the entry ports through which the reactive ingredients are introduced to the barrel.

The mixture of ingredients can be urged through the residence zone using only the pressure of the following mixed composition propelled by the screw-device or, if desired, pump means may be provided to assist the flow. If desired, a static mixing device can be placed in the residence zone. The present inventors have found that mixtures remaining in the residence zone for a period of the order of about 4 to 15 minutes show a desirable degree of processing.

THE INGREDIENTS OF THE CURABLE ORGANOSILOXANE COMPOSITION

Organosiloxane compositions for use in the present method include at least one silanol-terminated polyorganosiloxane containing at least two silanol groups per molecule.

The polyorganosiloxane can be linear or branched but is preferably an at least substantially linear alpha, omegadihydroxypolysiloxane represented by the general formula $HO(R_2SiO)_xH$ wherein each R represents a saturated or unsaturated hydrocarbon radical containing up to 12 carbon atoms that can be substituted or unsubstituted. One examples of such hydrocarbon radicals are aliphatic radicals. The viscosity of the polyorganosiloxane is from 30 to 1000 Pa.s (300 to 100 poise).

The polyorganosiloxane may include branching units according to the formula $R_aSiO_{(4-a)}$ wherein R is as defined hereinabove and the value of a is 0 or 1, but this is generally not preferred.

Polyorganosiloxanes and methods for preparing these polymers are well known. These polymers are usually made by the addition of diorganodichlorosilanes to a water/solvent mixture to yield a mixture of low molecular weight silanol-terminated oligomers and cyclic siloxanes in solvent. Linear alpha, omegadihydroxy polydiorganosiloxanes of desired molecular weight can be manufactured from the low molecular weight linear alpha, omegadihydroxy polydiorganosiloxane oligomers produced as described in the preceding section of this specification or by a process involving ring opening of the cyclic materials referred using condensation and equilibration in presence of a basic or an acidic catalyst.

In preferred polydiorganosiloxanes materials at least 85% and preferably all of the R groups are methyl.

Organosiloxane compositions for use in a process according to the invention also include a crosslinking agent which is, for example, a silane of the formula $R'_aR''_bSi$ or a siloxane having units $R'_aR''_cSiO_{[4-(a+c)]}$ wherein each $R'$ represents a monovalent hydrocarbon radical, each $R''$ represents an hydroxy, alkoxy, alkoxyalkoxy or oximo group, $a+b=4$, a has a value 0 or 1, b has a value 3 or 4 and c has a value 2 or 3.

Crosslinking agents which can be used include but are not limited to the known moisture vapor activated crosslinkers which employ alkoxy or alkoxyalkyl substituted silanes as exemplified by methyltrimethoxysilane. These crosslinking agents serve to form a mixture and/or a reaction product of the silanol-terminated polyorganosiloxane with a compound containing silicon-bonded groups which are reactive with, or become reactive with, (e.g. under influence of atmospheric moisture) the silicon-bonded hydroxyl groups of the polyorganosiloxane.

The present organosiloxane compositions also comprise a catalyst for the curing reaction which takes place in presence of moisture. Catalysts which can be employed include the known titanium compound catalysts, including certain alkyl titanate salts and alkyltitanium esters for example tetraisobutyl titanate and tetraisopropyl titanate.

The present compositions may, and preferably do, contain at least one finely divided filler of the type generally recommended for use in moisture curable silicone compositions, for example ferric oxide, diatomaceous earth, alumina, hydrated alumina, titanium oxide, glass micro-balloons, organic fillers or resins, crushed quartz, calcium sulphate, oxides, hydroxides, carbonates or bicarbonates of calcium, magnesium, barium or zinc, barium sulphate and precipitated or fumed silicas or mixtures thereof. The commercially available calcium carbonates may be used, and surface treated materials are preferred, for example those which have been surface coated with an aliphatic, araliphatic or other acid or salt, for example stearic or dodecylbenzene sulphonic acid.

Inclusion of larger proportions of certain silicas and carbonates dramatically affects flowability of the composition, which is reflected in processing characteristics and particularly in difficulty of mixing the composition. The filler employed and the proportion used also influences other properties of the composition. The adhesion properties of silicone sealants are generally augmented when necessary by use of primers on the surfaces to be sealed or by inclusion of adhesion promoters in the composition.

The present compositions, particularly those which use higher proportions of filler, may include a plasticizer, for example a non-reactive silicone fluid or gum such as a trialkylsilyl end-blocked polydiorganosiloxane, or an organic diluent, for example an aromatic petroleum hydrocarbon such as petroleum naphtha or a polyether. One may also include in a composition for use in the present process invention the usual optional additives, for example colorants, antioxidants, liquid extenders, for example polydimethylsiloxane fluids, flow control agents and adhesion promoters, for example gammaaminopropyltrimethoxysilane.

PREPARATION OF MOISTURE CURABLE ORGANOSILOXANE COMPOSITIONS

In carrying out a process according to the invention, the ingredients may be introduced to the barrel of the screw-extruder device in any convenient order and the ingredients may be fed to the barrel singly or in admixture with some or all of another ingredient, and may be fed in a single stream or in several streams. For example, in one process exemplified in this specification a first feed stream comprises hydroxy terminated polydimethylsiloxane, a second feed stream consists essentially of divided calcium carbonate, a third feed stream consists essentially of a liquid flow control agent, a fourth stream contains a trimethylsilyl-terminated polydimethylsiloxane and a silanol-terminated polydimethylsiloxane, and a fifth feed stream consists essentially of a mixture of the crosslinking material, catalyst and adhesion promoter.

It is necessary to remove excess water from the ingredients before the crosslinking agent is introduced to the mixture, and this is preferably done through one or more vents of the extruder located "upstream" (relative to the direction of flow of the mixture through the extruder barrel) from the port through which the crosslinker and catalyst are introduced to the mixture in the extruder. Colorants and minor additives may be added to the mixture at any desired stage and this is preferably done as near the end of the mixing procedure as possible.

The composition may then be extruded and charged into cartridges or drums.

DETAILED DESCRIPTION OF THE DRAWINGS

Figure 2:
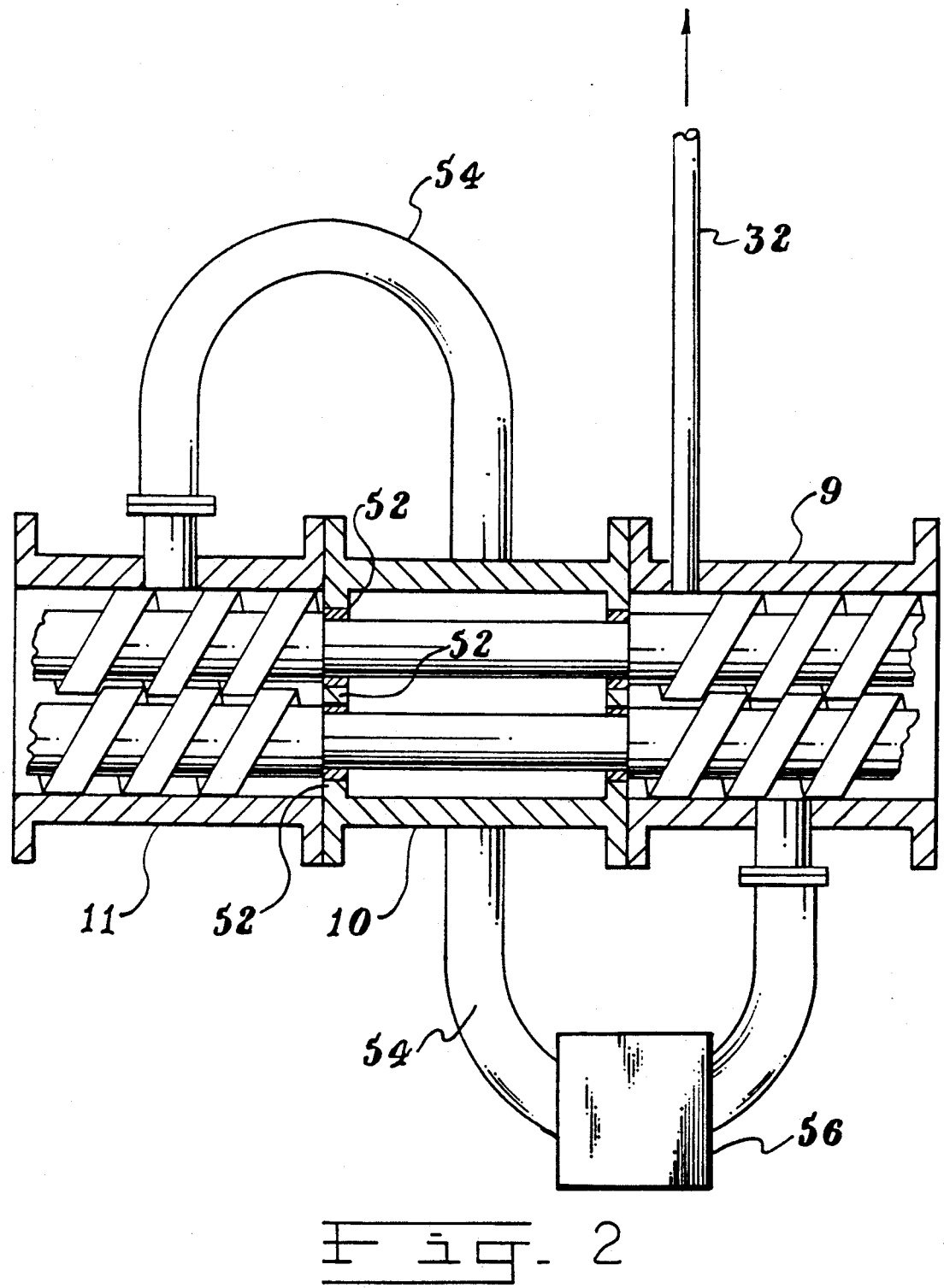
FIG. 2 is a diagrammatic plan view, partly in cross section of a portion of the device showing a preferred type of residence zone.

The invention provides in another of its aspects a modified devolatilizing extruder suitable for use in the continuous production of moisture curable organosiloxane composition in accordance with the present method. A preferred embodiment of the modified devolatilizing extruder of the present invention is depicted in FIGS. 1 and 2 of the accompanying drawings.

The extruder comprises a barrel containing 14 sections (1–14) and equipped with suitable support means (16 and 18) and a screw device (20). Sections 1–9 of the barrel constitute a first mixing zone (22) and contain a number of entry ports (24, 26, 28, 30, and 32) through which the ingredients of the moisture curable composition enter the barrel of the extruder and two vents (36 and 38).

Sections 11–14 of the barrel constitute a second mixing zone (34) and contain a vent (40) through which volatile materials can leave the barrel and an exit orifice (42) through which the final moisture curable composition is extruded from the barrel. Vents 36 and 38 are located in the first mixing section to remove any excess water prior to addition of the crosslinking agent and catalyst.

The barrel contains two screws (44 and 46) with single or double helical flights. Means (not shown) are provided for circulating cooling or heating fluid through the extruder from the support (16).

The configuration of the mixing chamber (48) within the barrel conforms closely to the external diameters of the screw flights. The screws are driven by a motor located in the support section (18) of the extruder. The screws are double flight and are journaled for rotation in the mixing chamber (46).

The screws are arranged so that the rotating screw flights mix ingredients supplied to the mixing zone through the ports (24, 26, 28, 30, and 32) and transport the resultant mixture through the mixing zone in the direction of exit orifice (42) and as far as a wall (50)

separating sections 9 and 10 of the extruder barrel. A second wall (52) separates section 10 of the extruder barrel from section 11.

Upon arriving at wall (50) the material in the mixing zone is forced to leave the barrel of the extruder and travel through the residence zone (54). After travelling through the residence zone the material reenters the barrel of the extruder at section 11, which is isolated from section 10 by means of a second wall (52), and is transported by the action of the screws to the exit orifice (42). The residence zone provides the only conduit for material passing between the first and second mixing zones of the extruder barrel.

The sections of each screw adjacent to wall (50) and extending through this wall have flights pitched in the opposite direction from the flight along the remainder of the screw, and act to impede the flow of material through this section of the barrel. Wall (50) and the reverse thrust of the screw cooperate to check the flow of material along the barrel and provide a barrier between sections (10) and (11) of the extruder.

Pumping means (56) is provided to assist the flow of material through the residence zone (54). The pressure of material being propelled by the screw device in sections 1-9 of the barrel and the pumping means cooperate in urging the flow of material in the residence zone.

EXAMPLE

Using the extruder shown in the accompanying drawings, a curable composition was prepared in accordance with the present method by introducing streams of ingredients through one or more of the entry ports 24, 26, 28, 30 and 32. The types and amounts, in parts by weight, of ingredients were: 100 parts of a hydroxylterminated polydimethylsiloxane having a viscosity of about 50 Pa.s at 25° C. and a hydroxyl content of 0.057 weight percent, 20 parts of a trimethylsilyl terminated polydimethylsiloxane having a viscosity of 100 centistokes, 125 parts of a finely divided filler comprising a mixture of 80 parts of a high surface area stearate coated precipitated calcium carbonate having a surface area of 20 m$^2$/g. and 25 parts low surface area stearate coated ground calcium carbonate having a surface area of 1 to 2 m$^2$/g, 6 parts of methyltrimethoxysilane, 2 parts of di(isopropyl)di(ethylacetoacetate) titanate catalyst, 0.2 part of N-aminoethyl-gamma-aminopropyltrimethoxysilane and 1.03 parts of dodecylbenzene sulphonic acid. A first stream was introduced through the port 24 and comprises a portion of the hydroxy-terminated polydimethylsiloxane. A second feed stream was introduced through port 26 and comprised the finely divided filler mixture, a third feed stream was introduced through the part 28 and comprised the dodecylbenzene sulphonic acid, a fourth feed stream was introduced through the port 30 and comprised the trimethylsilyl-terminated polydimethylsiloxane, and the balance of the hydroxy-terminated polydimethylsiloxane, and a fifth feed stream was introduced through the port 32 and comprised a mixture of the crosslinking material, the catalyst and the adhesion promoter.

Excess water and other volatile materials were removed from the mixture in the zone via the vents 36 and 38 before introduction of the crosslinking agent to the mixture via port 32.

In carrying out the illustrative process, the rate of rotation of the screws determines the mastication of the mixture and the rate at which composition is transported through the barrel, and is chosen so that mixing to homogeneity is achieved in the shortest possible time. The passage of the composition through the residence zone permits a certain maturing of the composition to the form in which it is to be packaged, accompanied by generation of by-products.

After the required passage through the residence zone the composition is subjected to final mastication by the screws and volatile materials are extracted via the vent (40). The composition is then dispensed from the zone via the exit orifice (42) into storage containers for example cartridges or drums.

The apparatus was arranged so that the mixed composition was resident in the first mixing zone (22) of the extruder for a period of about 1 to 2 minutes in the residence zone (54) for a period of about 10 minutes, and in the second mixing zone (34) for about 0.1 to 0.3 minute.

Samples of the moisture curable organosiloxane composition dispensed from the exit nozzle were stored for one week at room temperature in sealed cartridges. Each sample was tested for physical properties and adhesion and found to be very similar to the other samples and to provide an acceptable room temperature curable sealant composition.

That which is claimed is:

1. A process for the continuous preparation of a moisture curable composition comprising the steps of
    1) continuously introducing into a first mixing zone of a screw-extruder the ingredients of said a composition to form a mixture comprising at least one silanol-terminated polyorganosiloxane containing at least two silanol groups per molecule, one or more polyalkoxy silanes and a catalyst for the curing reaction,
    2) subjecting the mixture to the mixing and transporting action of the screw of the screw-extruder in said first mixing zone for a period of time to effect blending the ingredients of said mixture to homogeneity,
    3) transporting said mixture from said first mixing zone through a residence zone in which the mixture is not subjected to the mixing action of said screw, in which residence zone said mixture is permitted to react for a period of time, and
    4) transporting said mixture from said residence zone through a second mixing zone of said extruder located downstream relative to said first mixing zone, wherein volatile materials are removed from the mixture to form said composition, and,
    5) extruding the composition into storage containers.

2. A process according to claim 1 wherein the residence time of said mixture in said first mixing zone is from 1 to 2 minutes.

3. A process according to claim 1 wherein the residence time of said mixture in said residence zone is from 4 to 15 minutes.

4. A process according to claim 1 wherein the residence time of said mixture in said second mixing zone is from 0.1 to 0.3 minute.

5. A process according to claim 1 wherein the silanol-terminated organosiloxane is of the general formula HO(R$_2$SiO)$_x$H wherein each R represents a hydrocarbon group having up to 12 carbon atoms and x has a value such that the polyorganosiloxane has a viscosity in the range 30 to 1000 poise, the curing agent is a silane of the formula R'$_a$R"$_b$Si wherein each R' represents a monovalent hydrocarbon group, each R" represents an hydroxy, alkoxy, alkoxyalkoxy or oximo group, a+b=4, a has a value 0 or 1 and b has a value 3 or 4.

6. A process according to claim 1 wherein the composition also comprises at least one finely divided filler.

7. A process according to claim 1 wherein the ingredients of the composition are supplied to the screw-extruder device in several streams singly or in admixture with other ingredients of the composition.

8. A process according to claim 7 wherein a first feed stream comprises a silanol-terminated polydimethylsiloxane, a second feed stream comprises finely divided calcium carbonate, a third feed stream comprises a liquid flow control agent, a fourth feed stream comprises a plasticizer and said silanol-terminated polydimethylsiloxane and a fifth feed stream comprises the curing agent, catalyst and adhesion promoter.

9. In a devolatilizing extruder suitable for the continuous production of a moisture curable organosiloxane composition, said extruder comprising a barrel having first and second mixing zones, where said first mixing zone contains at least one entry port through which ingredients of the composition are supplied into the barrel and at least one vent means for removal of excess water, said second mixing zone is located downstream with respect to said first mixing zone, contains vent means through which volatile components can leave said barrel and an exit orifice through which the composition is extruded from the barrel, the barrel contains a screw device which is rotatable within the barrel and has screw flights arranged to mix ingredients supplied to the barrel and to transport the mixture through the barrel; the improvement comprising a residence zone that is external to said barrel and provides the only conduit for transporting the ingredients of said composition from said first to said second mixing zones, whereby said ingredients are transported through the residence zone to said second mixing zone for extrusion therefrom by means of said screw device.

10. Apparatus according to claim 9 wherein the screw device comprises a twin screw having two fully intermeshing co-rotating screws installed parallel to each other in the barrel.

11. Apparatus according to claim 9 wherein the residence zone comprises a tube communicating with the interior of the barrel and connecting said first mixing zone with second mixing zones upstream relative to said vent means in said second mixing zone.

12. Apparatus according to claim 9 further comprising pump means for assisting flow of composition through the residence zone.